US006775322B1

(12) United States Patent
Zangi et al.

(10) Patent No.: US 6,775,322 B1
(45) Date of Patent: Aug. 10, 2004

(54) EQUALIZER WITH ADAPTIVE PRE-FILTER

(75) Inventors: Kambiz C. Zangi, Durham, NC (US); Raymond Toy, Cary, NC (US); Dennis Hui, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 692 days.

(21) Appl. No.: 09/638,718

(22) Filed: Aug. 14, 2000

(51) Int. Cl.[7] .............................................. H03H 7/30
(52) U.S. Cl. ..................... 375/232; 375/233; 708/323
(58) Field of Search .............................. 375/229, 232, 375/233, 343, 350; 708/300, 322, 323

(56) References Cited

U.S. PATENT DOCUMENTS

| | | | | |
|---|---|---|---|---|
| 5,631,898 A | * | 5/1997 | Dent | 370/203 |
| 5,654,765 A | * | 8/1997 | Kim | 348/614 |
| 6,151,358 A | * | 11/2000 | Lee et al. | 375/232 |
| 6,222,592 B1 | * | 4/2001 | Patel | 348/614 |
| 6,317,467 B1 | * | 11/2001 | Cox et al. | 375/267 |
| 6,353,629 B1 | * | 3/2002 | Pal | 375/222 |
| 6,590,932 B1 | * | 7/2003 | Hui et al. | 375/232 |

FOREIGN PATENT DOCUMENTS

WO    WO01/71996    9/2001

OTHER PUBLICATIONS

Bush, James R., "Stability of Methods for Solving Toeplitz System of Equations", Siam J. Sci. Stat. Comput., vol. 6, No. 2, Apr. 1985, pp. 349–364.*

Bunch, James R., "Stability of Methods for Solving Toeplitz Systems of Eauations," Siam J. Sci. Stat. Comput., vol. 6, No. 2, Apr. 1985, pp. 349–364.

Chakraborty, Mrityunjoy, A Fast Algorithm for Solving Periodically Toeplitz Systems, International Symposium on Signal Processing and its Applications, ISSPA, Aug. 1996, pp. 702–705.

Smee, John E., and Schwartz, Stuart C., "Adaptive Feed-forward/Feedback Detection Architectures for Wideband CDMA," Communication Theory Mini–Conference, Jun. 6–10, 1999, pp. 151–157.

Ljung, Lennar; Morf, Martin; Falconer, David; "Fast Calculation of Gain Matrices for Recursive Estimation Schemes," Int. J. Control, 1978, vol. 27, No. 1, pp. 1–19.

Berberidis, Kostas; Rantos, Stelios; Palicot, Jacques; "Transform Domain Quasi–Newton Algorithms for Adaptive Equalization in Burst Transmission Systems," IEEE International Conference on Acoustics, Speech, and Signal Processing, May 7–11, 2001, vol. 4, pp. 2085–2088.

* cited by examiner

Primary Examiner—Jean B. Corrielus
Assistant Examiner—Qutbuddin Ghulamali
(74) Attorney, Agent, or Firm—Coats & Bennett P.L.L.C.

(57) ABSTRACT

A computationally efficient method for computing the filter coefficients for a prefilter in a decision feedback equalizer solves linear equations using a fast Toeplitz algorithm. Computations performed to compute the filter coefficients for the right half burst may be used to compute the prefilter for the left hand burst, thereby reducing the number of computations. Also, a square root-free algorithm may be used to solve the system of linear equations, further reducing computational complexity.

33 Claims, 10 Drawing Sheets

EQUALIZER WITH ADAPTIVE PRE-FILTER

BACKGROUND OF THE INVENTION

The present invention relates generally to an equalizer for a mobile communication system and, more particularly, to a pre-filter for an equalizer having adjustable filter coefficients.

Mobile communication systems use numerous signal processing techniques to improve the quality of received signals. Equalization is one technique that is commonly used to compensate for intersymbol interference (ISI) created by multipath propagation within time-dispersive channels. When the bandwidth of the communication channel is close to the signal bandwidth, modulation pulses are spread in time and overlap one another resulting in ISI. ISI causes higher error rates at the receiver and has been recognized as a major obstacle to high-speed data transmission over mobile radio channels. Equalization compensates for channel-induced distortion to reduce intersymbol interference and therefore reduces error rates at the receiver.

The two main operating modes of an equalizer include training and tracking. First, a known, fixed length training sequence is sent by the transmitter. The training sequence is typically a pseudo-random binary signal or a fixed, prescribed bit pattern that is known a priori, by the receiver. User data is transmitted immediately following the training sequence. The training sequence allows the receiver to estimate an initial set of filter coefficients used when the receiver begins receiving user data. As user data is being received, the equalizer at the receiver typically utilizes an adaptive algorithm to continuously evaluate the channel characteristics and make needed adjustments to the filter coefficients. Thus, the equalizer tracks changes in the impulse response of the communication channel and continuously updates the filter coefficients to compensate for such changes.

Equalization techniques can be subdivided into two general categories—linear and non-linear equalization. A linear equalizer can be implemented as a finite impulse response (FIR) filter, otherwise known as a transversal filter. In this type of equalizer, the current and past values of the received signal are linearly weighted by the filter coefficients and summed to produce the output. Linear filters are typically used in channels where ISI is not severe. In some non-linear equalizers, decisions about previously detected symbols are used to eliminate intersymbol interference in the current symbol. The basic idea is that once a symbol has been detected and decided upon, the ISI that it induces on future symbols can be estimated and subtracted out before a decision is made on the subsequent symbols. Because of severe ISI present in mobile radio channels, non-linear equalizers are commonly used in mobile communications.

When the signal has no memory, the equalizer may employ symbol-by-symbol detection. On the other hand, when the transmitted signal has memory, i.e., the signals transmitted in successive symbol intervals are interdependent (which is typically the case when ISI is present), the optimum detector is a maximum likelihood sequence detector which bases its decisions on observation of a sequence of received signals over successive signal intervals. Thus, many equalizers used in mobile communications use a maximum likelihood sequence estimation (MLSE) equalizer. An MLSE equalizer typically has a large computational requirement, especially when the delay spread of the channel is large.

In some equalizers, such as a decision feedback equalizer (DFE) or decision feedback sequence estimation (DFSE) equalizer, the received signal is filtered before the decision algorithm is applied. Finding the appropriate filter coefficients accounts for a substantial portion of the computational load of the equalizer.

SUMMARY OF THE INVENTION

The present invention provides a computationally efficient method for computing coefficients of a finite impulse response pre-filter applied prior to the decision algorithm in the equalizer. The filter may be used, for example, in a decision feedback equalizer or in a Decision Feedback Sequence Estimation (DFSE) equalizer. According to the present invention, a processor estimates the impulse response of the communication channel and, based on the estimate of the channel impulse response, generates a system of linear equations that can be solved to determine the filter coefficients $\bar{f}$ of the pre-filter. Expressed in mathematical notation, a system of linear equations is defined as follows:

$$B\bar{f} = \bar{c}$$

where B is a complex-valued channel coefficient matrix, $\bar{f}$ is a complex-valued vector representing the filter coefficients, and $\bar{c}$ is a complex-valued target vector. The values of the channel coefficient matrix B and the target vector $\bar{c}$ are known and derived from the estimates of the channel impulse response generated by the processor based on a training sequence. To obtain the pre-filter coefficients for the filter, the system of linear equations is solved for the filter coefficient vector $\bar{f}$.

The standard method used in the prior art for finding the filter coefficient vector $\bar{f}$ requires performing a Cholesky factorization of the channel coefficient matrix B. Performing this Cholesky factorization requires approximately $L_f^2$ operations, where $L_f$ is the length of the pre-filter. According to the present invention, the number of operations needed to find the filter coefficient vector $\bar{f}$ is significantly reduced by taking advantage of the structural characteristics of the channel coefficient matrix B. The channel coefficient matrix B is partitioned into four sub matrices as follows:

$$B = \begin{vmatrix} T & R \\ R^H & X \end{vmatrix}$$

Filter coefficient vector $\bar{f}$ is partitioned into two subvectors $(\bar{v}, \bar{m})$ and target vector $\bar{c}$ is partitioned into two subvectors $(\bar{y}, \bar{a})$. Using the partitions of the coefficient matrix B, filter coefficient vector $\bar{f}$, and target vector $\bar{c}$, the system of linear equations is broken into two equations with two unknowns, $\bar{v}$ and $\bar{m}$.

The sub-matrix T of the coefficient matrix B is a Toeplitz Hermitian matrix. Solution of the system of linear equations requires that the sub-matrix T be inverted. Since T is a Toeplitz Hermitian matrix, a fast Toeplitz algorithm is used to invert T, thereby greatly reducing the number of operations needed to find the solution for the filter coefficient vector $\bar{f}$.

As described more fully below, additional properties of the channel coefficient matrix B may optionally be used to further reduce the number of operations needed to find the filter coefficients for the pre-filter and therefore improve computational efficiency.

DETAILED DESCRIPTION OF THE INVENTION

Figure 1:
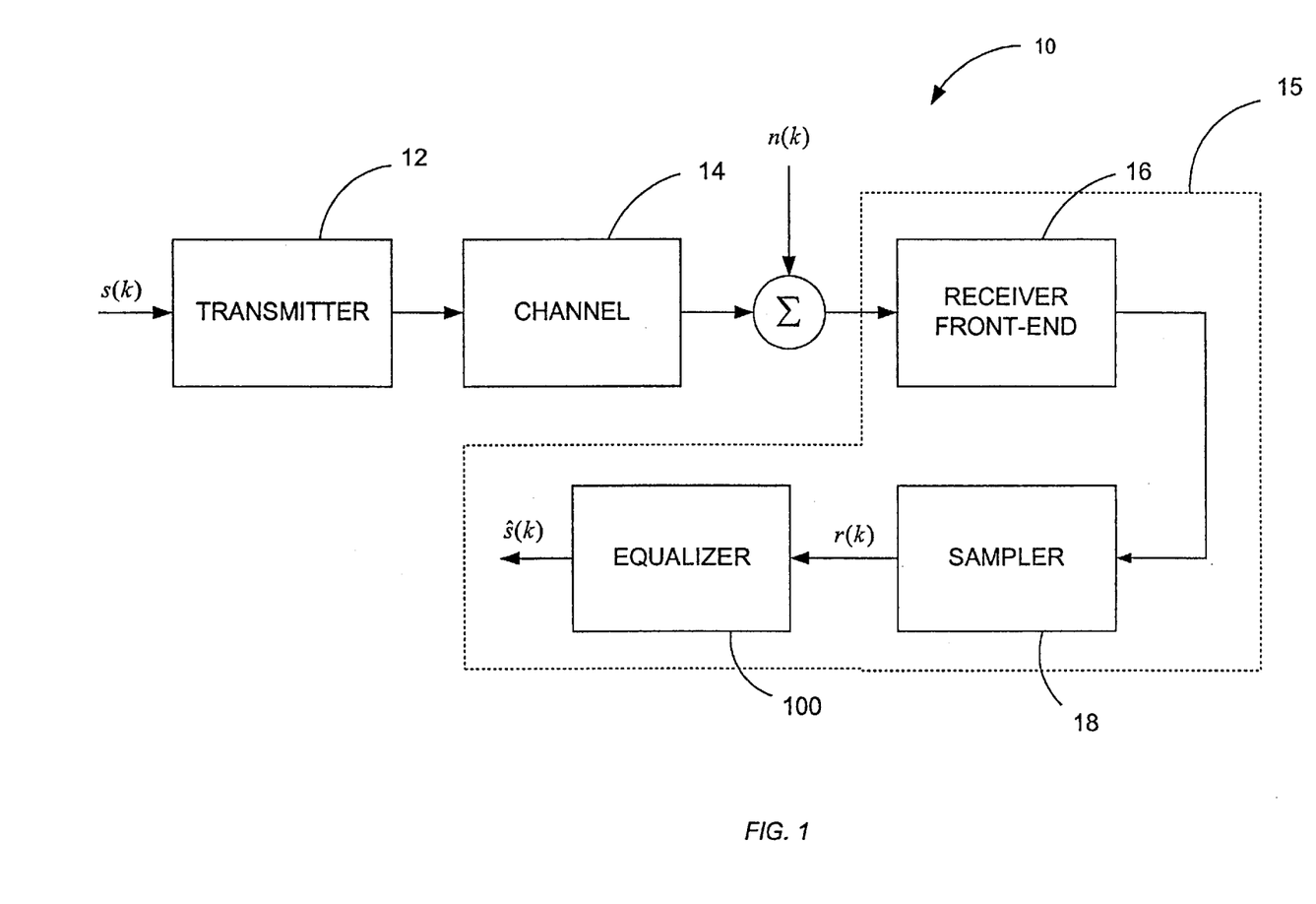
FIG. 1 is a block diagram of a digital mobile communication system according to the present invention using an equalizer at the receiver to reduce the effects of intersymbol interference.

FIG. 1 illustrates a digital mobile communication system indicated generally by the numeral 10. The digital communication system 10 comprises a transmitter 12, a linear filter communication channel 14, and a receiver 15. The transmitter 12 receives a sequence of information symbols s(k), which represents information to be transmitted. The transmitter 12 modulates the information symbols s(k) onto a carrier signal using a M-ary modulation scheme, such as pulse amplitude modulation (PAM) or quadrature amplitude modulation (QAM). The information symbols s(k) are mapped to a continuous time signal, referred to herein as the transmitted signal, at the output of the transmitter 12. The transmitted signal is subjected to disturbances in the communication channel 14 which may result in phase and/or amplitude distortion. The transmitted signal is also degraded by additive disturbance, such as additive white Gaussian noise (AWGN), denoted n(k). The channel-corrupted signal is received at a receiver 56.

The receiver 15 includes a receiver front-end 16, sampler 18, and equalizer 100. Receiver front-end 16 has a receive filter which is ideally matched to the impulse response of the transmitter 12. In actual practice, the ideal filter may not be realizable, so an approximation of the ideal filter may be used. Receiver front-end 16 amplifies the received signal and downconverts the received signal to a baseband frequency. The output of the receiver front-end 16 is sampled periodically by the sampler 18. The sampling process converts the received signal to a discrete sequence, which is referred to herein as the received sequence r(k). The received sequence r(k) is passed to an equalizer/detector, which for convenience is referred to simply as equalizer 100. The purpose of the equalizer 100 is to estimate the originally transmitted information symbols s(k) from the received sequence r(k). Equalizer 100 may, for example, be a decision feedback equalizer (DFE) or a decision feedback sequence estimation (DFSE) equalizer In a mobile communication system 10, the communication channel 14 alters or distorts the transmitted signal resulting in intersymbol interference (ISI). ISI in turn can cause symbol errors at the output of the equalizer 100. To minimize errors caused by ISI, the equalizer 100 employs an adaptive algorithm to minimize the effects of ISI.

Figure 2:
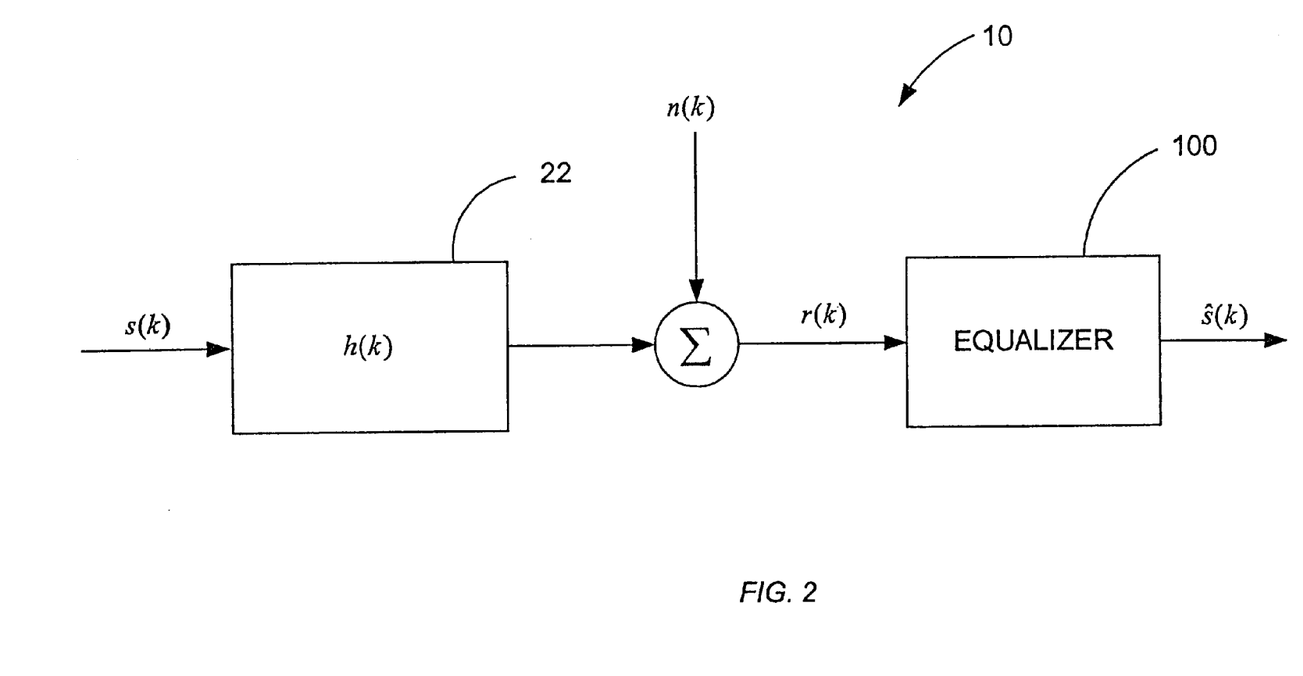
FIG. 2 is a model of the digital mobile communication system of FIG. 1 representing the transmitter, channel, and receiver front-end as a single linear filter with impulse response h(k).

FIG. 2 is a simplified model of the mobile communication system 10 of FIG. 1. The transmitter 12, channel 14, and receiver front-end 16 are represented in FIG. 1 as a single linear filter 22, referred to herein as the system filter 22, with impulse response h(k), referred herein as the system impulse response. The system impulse response h(k) is the combined baseband impulse response of the transmitter 12, communication channel 14, and receiver 15. The output of the receiver 15 before equalization may therefore be expressed as:

$$r(k)=s(k)*h(k)+n(k) \qquad \text{Eq.(1)}$$

The task of the equalizer 100 is to determine, based on the received sequence r(k), the estimate $\hat{s}(k)$ of the information symbols s(k). For purposes of developing a mathematical model for the design of the equalizer pre-filter, it is assumed that the equalizer 100 is a DFE that makes decisions on a symbol-by-symbol basis. However, those skilled in the art will appreciate that the filtering techniques described herein may also be used in any equalizer 100 having a pre-filter preceding the decision algorithm 108.

Figure 3:
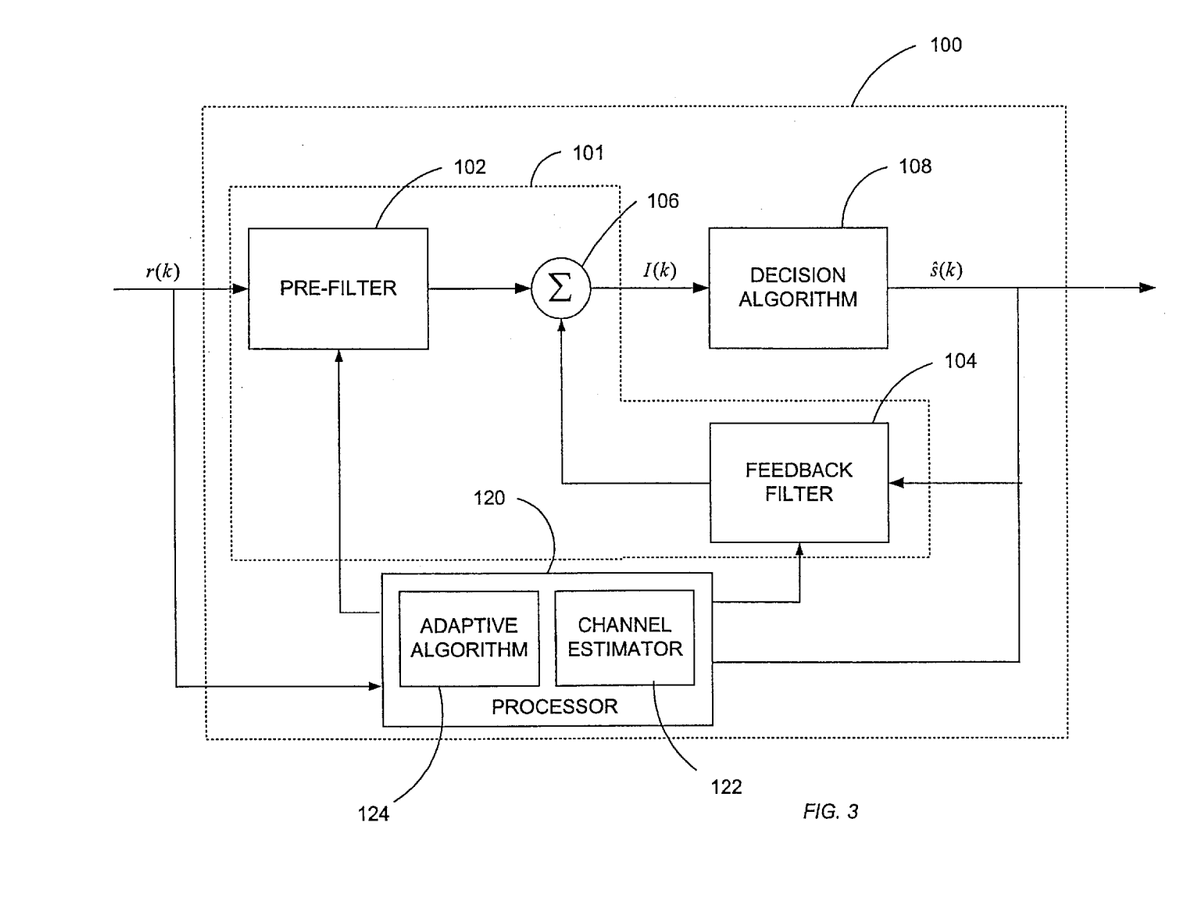
FIG. 3 is a block diagram of an exemplary equalizer according to the present invention with a feedback filter.

Referring now to FIG. 3, the exemplary equalizer 100 of the present invention comprises an equalization filter 101, decision algorithm 108, and processor 120. In the embodiment of FIG. 3, the equalization filter 101 comprises pre-filter 102, feedback filter 104, and summer 106. It is to be noted that the feedback filter 104 and summer 106 are not required elements of the equalizer 100 of the present invention; however, for a better understanding of the mathematical concepts described below the presence of these elements will be assumed. Pre-filter 102 may, for example, comprise a Finite Impulse Filter (FIR) with adjustable fractionally-spaced taps having adjustable tap coefficients. Pre-filter 102 may be implemented as a shift register filter with N delay elements as is well-known in the art. The input to the pre-filter 102 is the received signal r(k). The output of the pre-filter 102 is referred to herein as the filtered input signal.

The feedback filter 104 is likewise implemented as a FIR filter with symbol-spaced taps having adjustable tap coefficients. The output of the feedback filter 104 is used to eliminate or reduce ISI in the current symbol caused by the previously detected symbol. Summer 106 combines the output signal from the feedback filter 104, referred to herein as the filtered output signal, with the filtered input signal from the pre-filter 102 to form the input to the decision algorithm 108, which is referred to herein as the equalized input signal. Decision algorithm 108 determines, based on the equalized input signal, which of the possible transmitted symbols is closest in distance to the equalized input signal. The decision algorithm 108 generates an output signal which is an estimate of the received symbol, denoted $\hat{s}(k)$. The output signal from decision algorithm 108 forms the input to the feedback filter 104.

Processor 120 includes a channel estimator 122 to estimate the impulse response of the communication channel and an adaptive algorithm 124 for computing filter coefficients of the pre-filter 102 and the feedback filter 104.

Figure 3A:
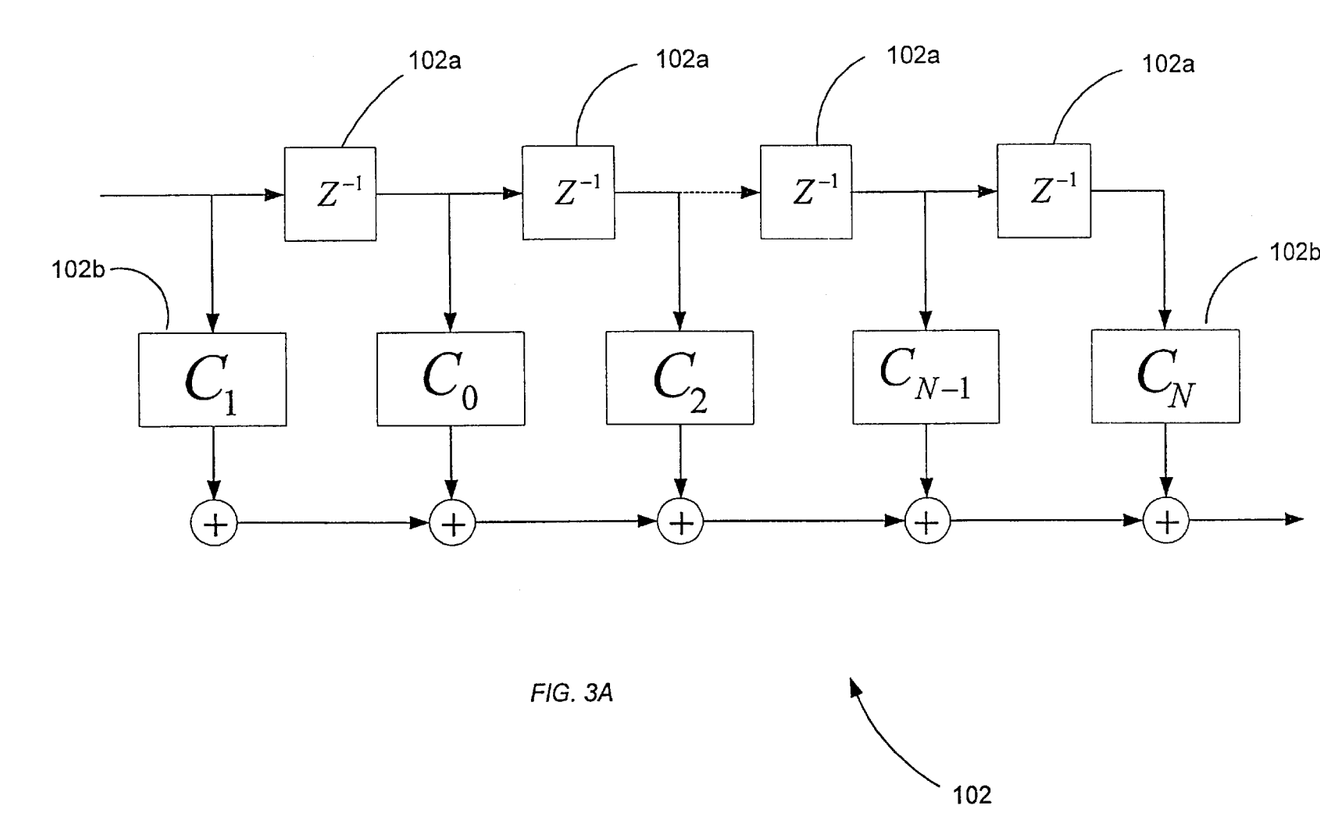
FIG. 3A is a block diagram of the pre-filter for the decision feedback equalizer shown in FIG. 3.

FIG. 3A is a more detailed block diagram of the pre-filter 102. As shown in FIG. 3A, pre-filter 102 comprises a plurality of delay elements 102a and taps 102b. Each tap 102b has an associated tap coefficient. During each symbol period, the input symbol, along with the contents of the delay elements 102a, are multiplied by the associated tap coefficients and summed to produce the filtered input signal.

The tap coefficients for the pre-filter 102 are adjusted as user data is received to optimize some desired performance characteristic. As previously indicated, the impulse response of the communication channel 14 is unknown and varying. An adaptive algorithm 124 is employed by the processor 120 to adjust the tap coefficients for pre-filter 102 and feedback filter 104 in response to changes in channel conditions. There are many different adaptive algorithms 124 used to adjust the tap coefficients. In general, the adaptive algorithm 124 uses an error signal to minimize a cost function and chooses the tap coefficients in a manner that minimizes the cost function. For example, the Mean Square Error (MSE) between the desired signal and the output of the equalizer 100 is a commonly used cost function. To compute the MSE, a known training sequence is periodically transmitted, and the system impulse response h(k) is estimated based on this training sequence. By detecting h(k), the adaptive algorithm 124 is able to compute and minimize the MSE by modifying the tap coefficients until the next training sequence is received.

The equalizer 100 of the present invention uses a reduced complexity adaptive algorithm 124 to compute the filter coefficients for the pre-filter 102. The adaptive algorithm 124 is based on the MSE, but other cost functions could be used. The adaptive algorithm 124 used by the processor 120 is described below.

Figure 4:
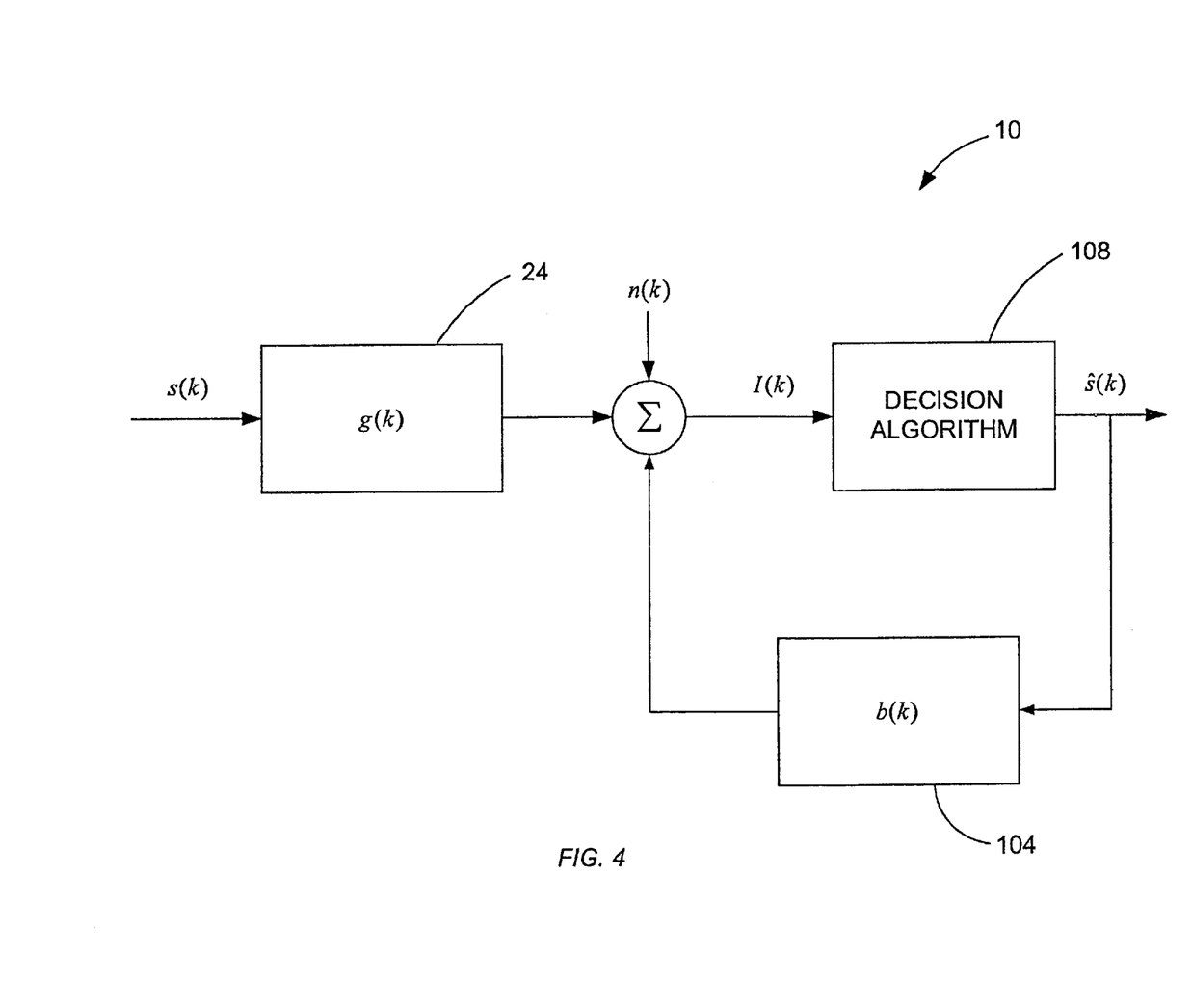
FIG. 4 is another model of the digital mobile communication system of FIG. 1 representing the transmitter, channel, receiver, and pre-filter as a single linear filter with impulse response g(k).

FIG. 4 is another model of the digital communication system 10. In the model shown in FIG. 4, the transmitter 12, channel 14, receiver front-end 16, and pre-filter 102 are represented as a single filter 24 with impulse response g(k). The impulse response g(k) is the combined baseband impulse response of the transmitter 12, channel 14, receiver front-end 16, and pre-filter 102. Stated another way, the impulse response g(k) of filter 24 is the combined baseband impulse response of the system filter 22, denoted h(k), and pre-filter 102, denoted f(k). The impulse response of the feedback filter 104 is denoted b(k).

The received symbol r(k) is convolved by the pre-filter 102 to generate an unequalized filtered input signal for the decision unit 108. I(k) represents the equalized input signal, i.e., the sum of the filtered input signal from the pre-filter 102 and the filtered output signal from the feedback filter 104. The equalized input signal I(k) is input to the decision algorithm 108. The output of the decision algorithm 108, denoted ŝ(k) is the estimate of the symbol received at time s(k−N) where N is the decision delay of the equalizer 100. The estimate ŝ(k) is convolved by the feedback filter 104 and combined with the filtered input signal from the pre-filter 102 at summer 106 to generate the equalized input signal I(k). At time k, the decision algorithm 108 makes a decision about symbol s(k−N) based on the single value I(k), i.e. the decisions are made on a symbol-by-symbol basis. The optimal pair (f(k),b(k)) minimizes the equation:

$$\Psi = E\{|I(k)-s(k-N)|^2\}, \quad \text{Eq.(2)}$$

where s(k−N) is the actual transmitted symbol and E{x} is the expected value of x. Equation (2) is referred to herein as the error function and is used as a cost function to be minimized by choosing f(k) and b(k).

Assuming that the estimate of the transmitted symbol output by the decision algorithm 108 is the actual transmitted symbol, i.e., ŝ(k)=s(k), the input signal I(k) can be expressed as follows:

$$I(k) = \sum_{l=0}^{L_g-1} g(l)s(k-l) + \sum_{l=0}^{L_f-1} f(l)n(k-l) + \sum_{l=1}^{L_b-1} b(l)s(k-N-l), \quad \text{Eq. (3)}$$

where $L_f$ is the length of the pre-filter 102, $L_b$ is the length of the feedback filter 104, and $L_g$ is the effective length of the filter 24 shown in FIG. 4. Equation (3) can be rewritten as:

$$I(k) = \sum_{l=0}^{N} g(l)s(k-l) + \sum_{l=1}^{L_g-1-N} g(l+N)s(k-l-N) + \sum_{l=0}^{L_f-1} f(k)n(k-l) + \sum_{l=1}^{L_b-1} b(l)s(k-N-l). \quad \text{Eq. (4)}$$

The second and fourth terms in Equation (4) represent ISI from symbols transmitted before time k−N. By choosing b(l)=−g(l+N), where N=$L_f$−1 and $L_b$=$L_h$, the second and fourth terms in Equation 4 will cancel, resulting in:

$$I(k) = \sum_{l=0}^{L_f-1} g(l)s(k-l) + \sum_{l=0}^{L_f-1} f(l)n(k-l) \quad \text{Eq. (5)}$$

Substituting Eq.(5) into Eq.(2) yields the following:

$$\Psi = E\{|I(k)-s(k-L_f+1)|^2\} = \quad \text{Eq. (6)}$$

$$|g(L_f-1)-1|^2 + \sum_{l=0}^{L_f-2} |g(l)|^2 + \sigma^2 \sum_{l=0}^{L_f-1} |f(l)|^2.$$

Note that since b(l)=−g(l+N), and g(l) can be determined from f(l) and h(k), we only need to find the minimizing f(l), and the b(l) and g(l) can be computed from f(l).

In the last step it is assumed that s(k) and n(k) are independent, that n(k) is an additive white Gaussian noise (AWGN) sequence with variance a $\sigma^2$, and that s(k) is independently identically distributed with unit variance.

Next, vectors $\bar{g}$ and $\bar{u}$ are defined as follows:

$$\bar{g} = \begin{bmatrix} g(0) \\ g(1) \\ M \\ g(L_f-1) \end{bmatrix} \quad \text{(Eq. 7)}$$

$$\bar{u} = \begin{bmatrix} 0 \\ 0 \\ M \\ 1 \end{bmatrix}. \quad \text{(Eq. 8)}$$

Vectors $\bar{g}$ and $\bar{u}$ have a length equal to the length $L_f$ of the pre-filter 102. Vector $\bar{g}$ represents the coefficients of filter 24 in FIG. 4. The vector $\bar{u}$ is a selection vector with all "0"s except the final entry, which is "1." Similarly, a filter coefficient vector $\bar{f}$ with length $L_f$ is defined as:

$$\bar{f} = \begin{bmatrix} f(0) \\ f(1) \\ M \\ f(L_f - 1) \end{bmatrix}. \qquad \text{(Eq. 9)}$$

Filter coefficient vector $\bar{f}$ represents the coefficients of the pre-filter 102 which are computed by the processor 120 using the adaptive algorithm 124 described herein. Since $\{g(l)\}_{l=0}^{L_f + L_h - 2}$ has $(L_f + L_h - 1)$ non-zero coefficients, minimizing the first two terms in Equation (6) is equivalent to making $g(l) \approx u(l)$ for $0 \leq l \leq L_f - 1$. In vector notation, this is equivalent to making $\bar{g} \approx \bar{u}$. More specifically, the first term in Equation (6) represents minimizing ISI from symbols transmitted after time $k-L_f+1$ in the sample $I(k)$, i.e., the ISI in $I(k)$ caused by symbols $\{s(l)\}_{l=k-L_f+1}^{k}$. The impact of the ISI caused by the symbols transmitted before time $k-L_f+1$ in $I(k)$ is presumably cancelled completely by the feedback filter 104, assuming that all the decisions made by the decision algorithm 108 are correct.

The error function $\Psi$ to be minimized can be expressed in vector notation as:

$$\Psi = \|\bar{g} - \bar{u}\|^2 + \sigma^2 \|\bar{f}\|^2 \qquad \text{Eq.(10)}$$

where $\|x\|^2$ indicates the norm squared of the vector x. It can be shown that the vector $\hat{g} = A\bar{f}$, where A is essentially a truncated convolution matrix. The combined impulse response $g(k)$ of the transmitter 12, channel 14, receiver 16, and pre-filter 102 can be expressed as:

$$g(k) = \sum_{l=0}^{L_f - 1} f(l)h(k-l) \qquad \text{Eq. (11)}$$

which in vector notation can be written as:

$$= \bar{h}_k^T \bar{f}, \qquad \text{Eq.(12)}$$

where $\bar{h}_k^T = [h(k)h(k-1) \ldots h(k-L_f+1)]$. Each vector $\bar{h}_k^T$ has $L_h$ non-zero entries. The truncated convolution matrix A is defined in terms of vectors $\bar{h}_k$'s as:

$$A = \begin{bmatrix} \bar{h}_0^T \\ \bar{h}_1^T \\ M \\ \bar{h}_{L_f - 1}^T \end{bmatrix}. \qquad \text{Eq. (13)}$$

The truncation of A refers to the fact that $g(l)$ has $L_g = L_f + L_h - 1$ non-zero coefficients, but matrix A only corresponds to forming $\{g(l)\}_{l=0}^{L_f - 1}$ (i.e., first $L_f$ coefficients of $g(l)$). Once $f(l)$ is computed, $g(k)$ can be calculated based on $f(l)$ and $h(l)$ using Eq.(11). Further, $b(k)$ can be calculated based on $g(k)$ as $b(l) = -g(l+N)$.

The processor 120 finds the expression for vector $\bar{f}$ that minimizes the error function $\Psi$ in Equation (10). The expression for $\bar{f}$ that minimizes error function $\Psi$ in Equation (10) is the solution to the following system of linear equations:

$$B\bar{f} = A^H \bar{u}, \qquad \text{Eq.(14)}$$

where $B = A^H A + \sigma^2 I$ and $A^H$ is the Hermitian of the convolution matrix A. The selection vector $\bar{u}$ selects the last column of the matrix $A^H$, which is the same as the last row of the convolution matrix A. Matrix B is referred to herein as the channel coeffiecient matrix and the product $A^H \bar{u}$ is referred to as the target vector, which is denoted $\bar{c}$. Thus, Equation (14) may be written equivalently as $B\bar{f} = \bar{c}$.

Since A is not a complete convolution matrix, i.e., it is truncated, B is not exactly a Toeplitz matrix. Thus, equation (14) cannot be solved directly by use of fast (i.e., low computational costs) Toeplitz algorithms. The present invention overcomes this apparent drawback by partitioning B in such a manner that allows use of fast Toeplitz algorithms to solve parts of Equation (14). Fast Toeplitz algorithms are described in G. Golab and C. Van Loan, *Matrix Computations*, Johns Hopkins Univ. Press, 1991, which is incorporated herein by reference.

According to the present invention, the channel coefficient matrix B of size $(L_f, L_f)$ is partitioned in the following manner:

$$B = \begin{bmatrix} T & R \\ R^H & X \end{bmatrix}, \qquad \text{Eq. (15)}$$

where the size of T is $(L_f - L_h + 1, L_f - L_h + 1)$, the size of R is $(L_f - L_h + 1, L_h - 1)$, and size of X is $(L_h - 1, L_h - 1)$.

Some important properties of the above partition defined in Equation (15) are:

1. T is a complex-valued Toeplitz Hermitian matrix.
2. Matrix R has many zeros, and can be broken into:

$$R = \begin{bmatrix} 0 \\ R_l \end{bmatrix}, \qquad \text{Eq. (16)}$$

where 0 is an all zero matrix and $R_l$ is a lower triangular matrix of size $(L_h - 1, L_h - 1)$.

3. Similarly, $R^H$ can be broken into:

$$R^H = [0, R^H] \qquad \text{Eq.(17)}$$

where 0 is an all zero matrix and $R^H$ is an upper triangular matrix of size $(L_h - 1, L_h - 1)$.

4. The target vector $\bar{c}$, is simply the conjugate of the last row of the convolution matrix A. This implies that only the last $L_h$ elements of $\bar{c}$ are non-zero.

Based on the decomposition in Equation (15), the processor 120 can more efficiently solve Equation (14) to find the filter coefficients represented as the filter coefficient vector $\bar{f}$ that minimize the error function $\Psi$.

Figure 5:
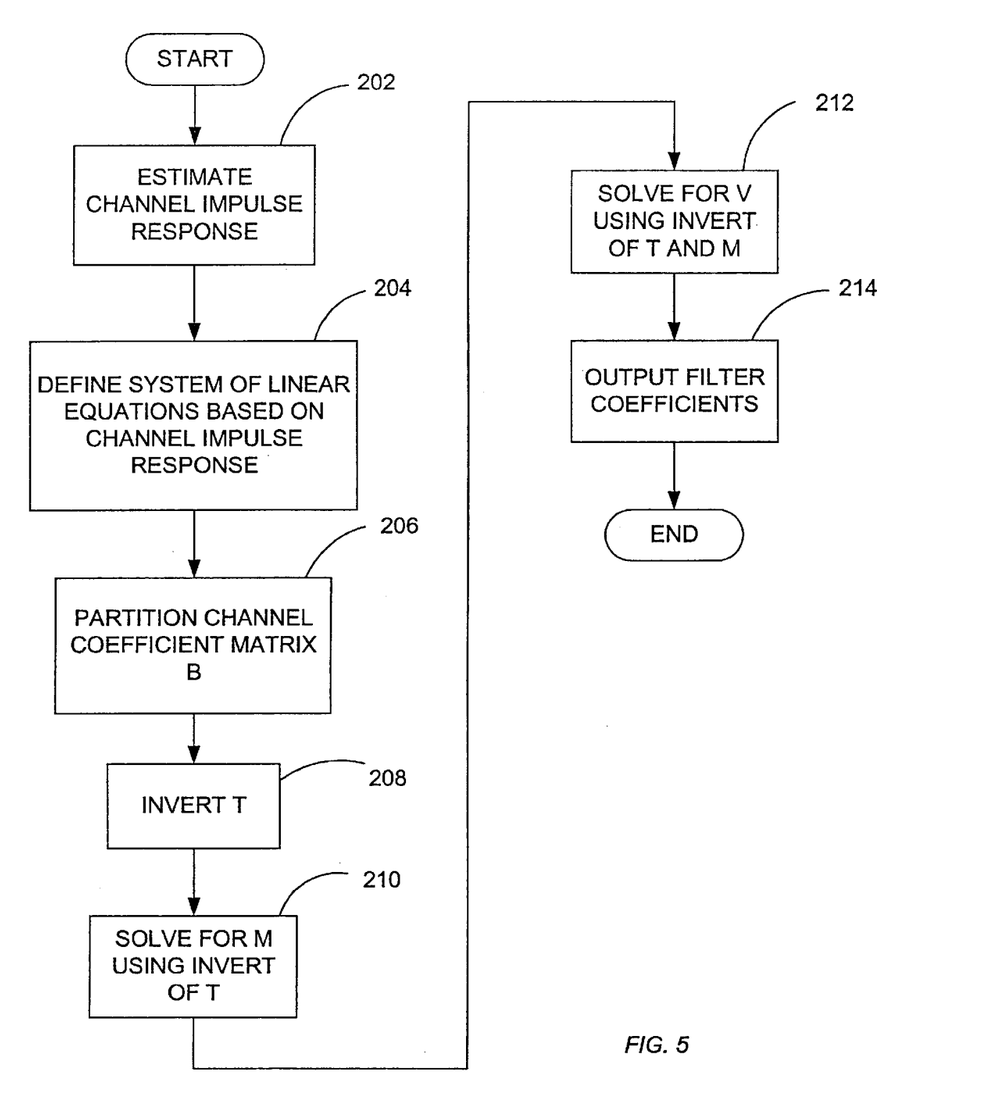
FIG. 5 is a flow diagram illustrating the logic of an exemplary adaptive algorithm used by the equalizer to adjust the filter coefficients of the pre-filter.

FIG. 5 illustrates the method implemented by the decision feedback equalizer 100 of the present invention to find the minimizing filter coefficients. The receiving terminal estimates the channel impulse response of the communication channel (block 202). Estimation of the channel impulse response is performed by a channel estimator 122. Using the estimated channel impulse response, a system of linear equations with an unknown filter coefficient vector $\bar{f}$ is defined according to Equation 14 (block 204). In particular, a channel coefficient matrix B, target vector $\bar{c}$, and unknown filter coefficient vector $\bar{f}$ are defined. The channel coefficient matrix B is then partitioned according to Equation 15 (block 206) yielding four sub-matrices. One of the sub-matrices is the Toeplitz matrix T, which must be inverted as hereinafter described (block 208). Additionally, the filter coefficient vector $\bar{f}$ and target vector $\bar{c}$ are partitioned to further aid solving of Equation (14). Following partitioning, Equation (14) can be rewritten as:

$$\begin{bmatrix} T & R \\ R^H & X \end{bmatrix} \begin{bmatrix} \bar{v} \\ \bar{m} \end{bmatrix} = \begin{bmatrix} \bar{y} \\ \bar{a} \end{bmatrix}, \qquad \text{Eq. (18)}$$

where $\bar{f}=[\bar{v};\bar{m}]$ and $\bar{c}=[\bar{y},\bar{a}]$. The subvectors $\bar{v}$ and $\bar{m}$ represent a partitioning of the vector $\bar{f}$ (block 210). The subvectors $\bar{y}$ and $\bar{a}$ represent a partitioning of the target vector $A''u$. The size of $\bar{y}$ is $(L_f-L_h+1,1)$, and the size of $\bar{a}$ is $(L_h-1,1)$. Note, that the size of the subvectors in $\bar{f}$ and $\bar{c}$ correspond to the size of the sub-matrices in channel coefficient matrix B.

The processor 120 solves Equation (18) for $\bar{v}$ and $\bar{m}$ (blocks 212 and 214). Expanding Equation (18), two equations with two unknowns, $\bar{v}$ and $\bar{m}$, are obtained as follows:

$$T\bar{v}+R\bar{m}=\bar{y} \qquad \text{Eq.(19)}$$

$$R^H\bar{v}+X\bar{m}=\bar{a} \qquad \text{Eq.(20)}$$

Solving equation (19) for $\bar{v}$ yields:

$$\bar{v}=T^{-1}\bar{y}-T^{-1}R\bar{m}. \qquad \text{Eq.(21)}$$

Substituting (21) into Equation (20), and rearranging yields:

$$(X-R^H T^{-1}R)\bar{m}=\bar{a}-R^H T^{-1}\bar{y}. \qquad \text{Eq.(22)}$$

Finding the solution to Equations (22) and (21) requires that the Toeplitz matrix T be inverted. The inverse of the Toeplitz matrix T, denoted $T^{-1}$, is obtained using a fast Toeplitz algorithm, such as the Trench algorithm (block 208). This computation will take approximately $(L_f-L_h+1)$ operations. Next using $T^{-1}$, the processor 120 solves Equations (22) and (21) to obtain the subvectors $\bar{v}$ and $\bar{m}$. In particular, the processor 120 first solves Equation (22) for the vector $\bar{m}$ (which is of size $(L_h-1,1)$)(block 210), and then substitutes the resulting vector $\bar{m}$ into Equation (21) to obtain the vector $\bar{v}$ (block 212). Solving Equation (22) for vector $\bar{m}$ can be accomplished in $(L_h-1)^3$ operations. Note that $(X-R^H T^{-1}R)$ is Hermitian and positive definite. After solving for subvectors $\bar{v}$ and $\bar{m}$, the processor 120 outputs the filter coefficients (block 214), which are simply the elements of the filter coefficient vector $\bar{f}$. This process is performed each time a new estimate of the impulse response of the communication channel 14 is computed.

The third property of matrix B described above can be exploited to reduce the number of operations needed to compute $R^H T^{-1}R$ in Equation (22). To this end, matrices S and Q are defined. The matrix S is defined such that $S=T^{-1}R$. The matrix Q is defined such that $Q=T^{-1}(:,L_f-2L_h+3:L_f-L_h+1)$ (i.e., Q is defined as the last $L_h-1$ columns of $T^{-1}$). The relationship of S and Q is given by:

$$S(:,i) = \sum_{j=i}^{L_h-1} Q(:,j)R_l(j,i) \qquad i=1:L_h-1 \qquad \text{Eq. (23)}$$

where $S(:,i)$ is the ith column of matrix S, and $Q(:,j)$ is the jth column of matrix $T^{-1}$.

The third and fourth properties of matrix B can also be exploited to reduce the number of operations needed to compute $W=R^H T^{-1}R=R^H S$. To this end, let us define $S_l=S(L_f-2L_h+3:L_f-L_h+1,:)$ (i.e., $S_l$ is defined as the last $L_h$ rows of S). Then it is easy to show that:

$$W(i,:) = \sum_{j=i}^{L_h-1} S_l(i,:)R_l^H(i,j) \quad i=1:L_h-1 \qquad \text{Eq. (24)}$$

$$= \sum_{j=i}^{L_h-1} S_l(i,:)R_l(j,i) \quad i=1:L_h-1. \qquad \text{Eq. (25)}$$

The fourth property of Equation (15) can be exploited to reduce the number of operations needed to compute $T^{-1}\bar{y}$. Since only the last element of $\bar{y}$ is non-zero, $T^{-1}\bar{y}$ is simply $y(L_f-L_h+1)\times T^{-1}(:,L_f-L_h+1)$, where $y(L_f-L_h+1)$ is the last element of vector $\bar{y}$.

In some communication systems, e.g., GSM system, the receiver 15 operates on a burst-by-burst basis, i.e., the receiver 15 first collects a burst of received samples, and then starts processing this collected burst. When the training symbols are located in the middle of the collected burst (e.g., bursts of the GSM system), the transmitted symbols to the left of the training symbols are typically detected separately from the transmitted symbols to the right of the training symbols. The transmitted symbols to the right of the training symbols are detected by equalizing the right half of the collected burst "forward in time." The transmitted symbols to the left of the training symbols are detected by equalizing the left half of the collected burst "backward in time." Two different equalization filters 101 must be used for forward equalization and for backward equalization.

Once the pre-filter 102 for forward equalization is computed, the computation of the pre-filter 102 for backward equalization can be simplified using the quantities computed for the computation of the forward prefilter.

Assuming that the coefficients for the forward pre-filter are computed first, the system impulse response used for forward equalization is h(n), and this h(n) results in the B matrix of Eq.(15). The system impulse response for backward equalization is then $$h_B(n)=h(L_h-1-n) \quad n=0,\ldots,L_h-1. \qquad \text{Eq.(26)}$$

To compute the pre-filter 102 for backward equalization, the system impulse response must be changed from h(n) to $h_B(n)$ as defined in Eq.(36). Matrix $B_B$ is the B Matrix corresponding to $h_B(n)$, and this matrix can be again partitioned as $$B_B = \begin{bmatrix} T_B & R_B \\ R_B^H & X_B \end{bmatrix}. \qquad \text{Eq. (27)}$$

Figure 6:
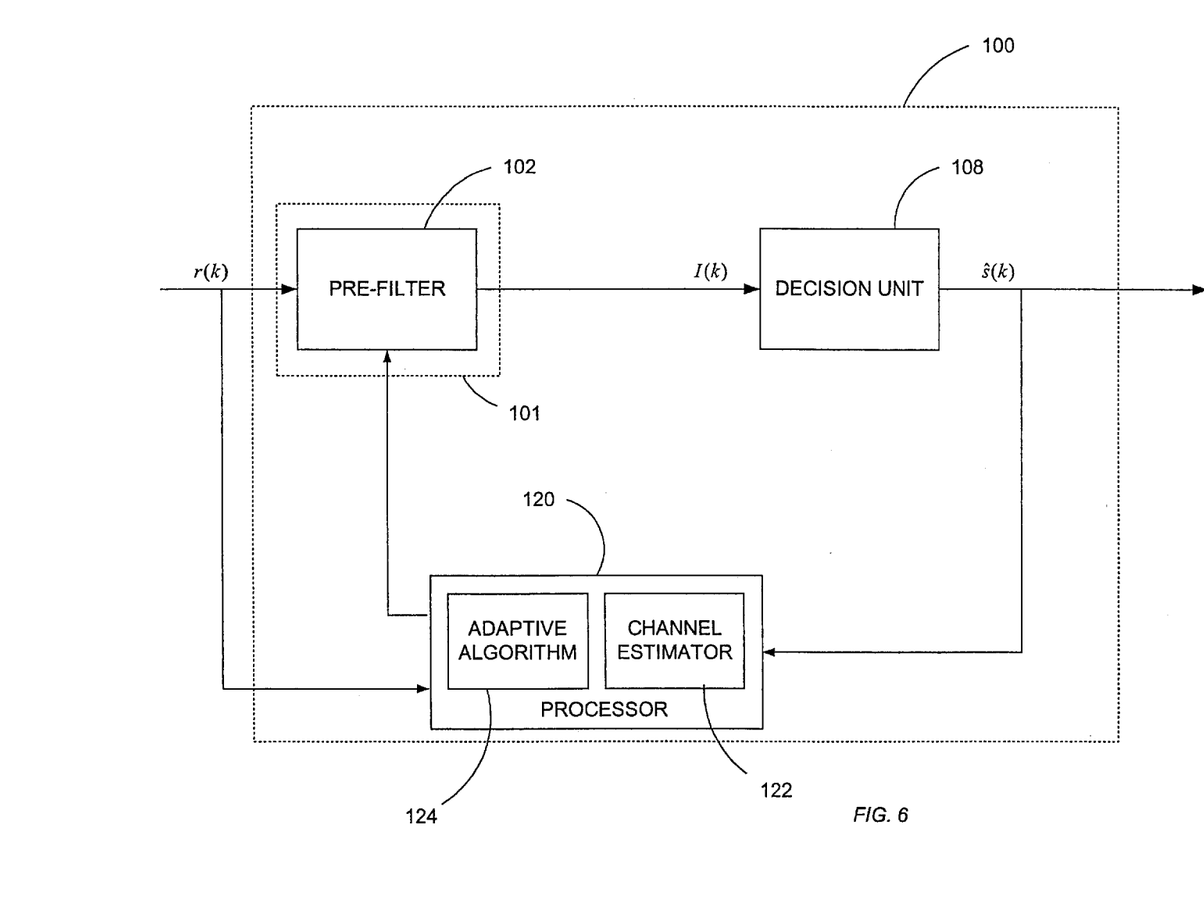
FIG. 6 is an alternate embodiment of the equalizer without a feedback filter.

$X_B$ is completely different from X in Eq.(15). However, $T_B=T^*$, i.e., the conjugate of in Eq.(15). Hence, $T_B^{-1}=(T^{-1})^*$, i.e., once $T^{-1}$ is computed, $T_B^{-1}$ can be computed by just taking the conjugate of $T^{-1}$. Since computation of $T_B^{-1}$ is relatively complex, this procedure significantly reduces the computational complexity. Similarly, $R_B^H T_B^{-1} R_B = R^H T^{-1} R)$ *, i.e., once $(R^H T^{-1} R)$ is computed for the forward pre-filter 102, $(R_B^H T_B^{-1} R_B)$ can be computed by taking the conjugate of $(R^H T^{-1} R)$ FIG. 6 illustrates an alternate embodiment of the equalizer 100 of the present invention. The embodiment of FIG. 6 is similar to the embodiment of FIG. 4 and therefore similar reference numbers are used in the two Figures to indicate similar components. The equalizer 100 includes an equalization filter 101, decision unit 108, and a processor 120. The equalization filter 101 includes a pre-filter 102. This embodiment does not include a feedback filter 104. Processor 120 comprises a channel estimator 122 and an adaptive algorithm 124 as previously described. Pre-filter 102 may, for example, comprise a finite impulse response filter with adjustable fractionally-spaced taps having adjustable tap coefficients. Pre-filter 102 may be implemented as a shift register filter within delay elements, as is well known in the art. The input to the pre-filter 102 is the received signal r(k). The output of the pre-filter 102 is input to the decision algorithm 108. Decision algorithm 108 may be a symbol-by-symbol detector or sequence estimation algorithm, such as the Viterbi algorithm or Maximum Likelihood Sequence Estimation (MLSE) algorithm. The decision algorithm 108 generates an output signal, which is an estimate of the received symbol, denoted s(k). The output signal from the decision algorithm 108 is input to processor 120, along with the received signal r(k). Processor 108 includes a channel estimator 122 to estimate the impulse response of the communication channel and an adaptive algorithm 124 for computing filter coefficients for the pre-filter 102. Processor 120 computes the filter coefficients as previously described.

Figure 7:
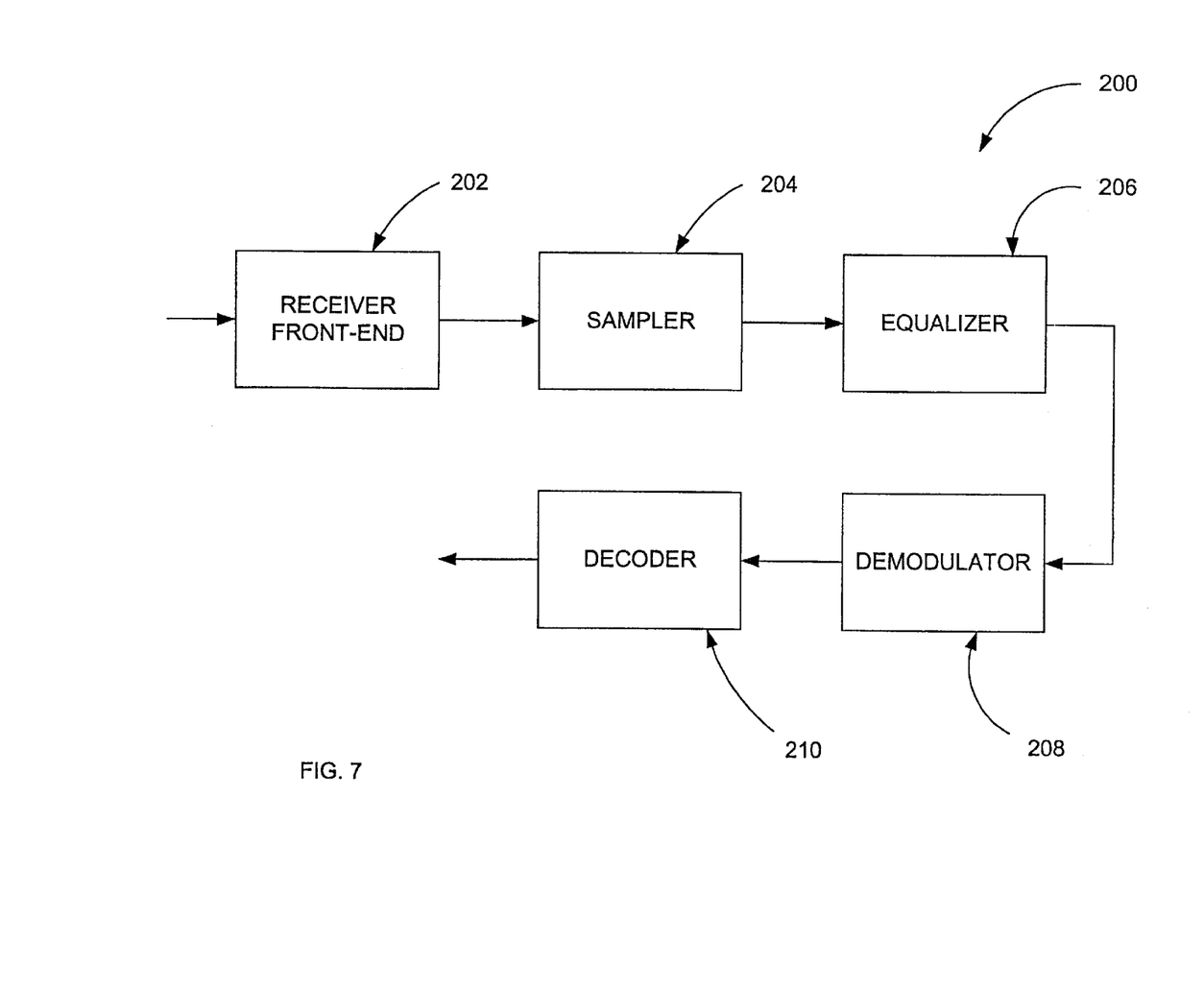
FIG. 7 is a block diagram of a receiver incorporating the equalizer of the present invention.

FIG. 7 is a block diagram of a receiver 200 incorporating the equalizer 100 of the present invention. Receiver 200 includes a front-end 202, sampler 204, equalizer 100, demodulator 208, and decoder 210. Receiver front-end 202 amplifies the received signals and converts the frequency of the received signals to the baseband frequency for baseband processing. Baseband signals output from receiver front-end 202 are sampled by sampler 204 to convert the baseband signal from a continuous time signal to a discrete signal. The sampled baseband signal is input to equalizer 100 of the present invention which produces an estimate of the originally-transmitted symbol sequence. The estimated symbol sequence output from equalizer 100 is input to a demodulator 208, which demodulates the received symbols and outputs a bit sequence corresponding to the transmitted bit sequence. The demodulated bits form demodulator 208 are input to channel decoder 210, which generates an estimate of the originally-transmitted information bits. Assuming that all errors are detected and corrected the estimate output by the channel decoder 210 is an exact replica of the original information bits that were transmitted.

Figure 8:
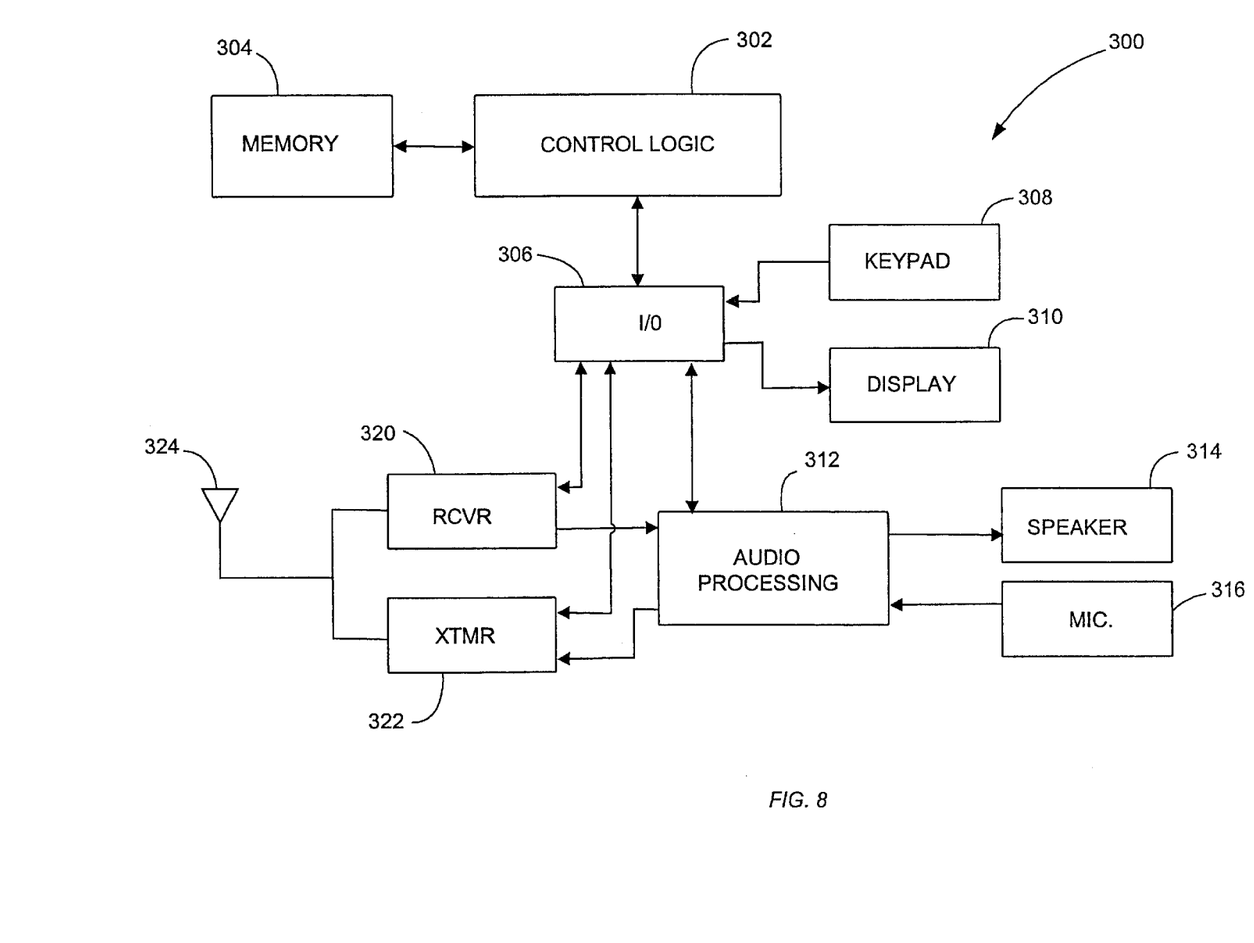
FIG. 8 is a block diagram of a mobile terminal incorporating the receiver of FIG. 7.

FIG. 8 is a block diagram of a mobile terminal, indicated generally by the numeral 300, incorporating the receiver 200 of FIG. 7. The mobile terminal may, for example, be a fully functional cellular radiotelephone, personal digital assistant, or other pervasive device. The mobile terminal 300 includes control logic 302 for controlling the operation of the mobile terminal 300 and a memory 304 for storing control programs and data used by the mobile terminal 300 during operation. Control logic 302 may, for example, comprise one or more microprocessors. Input/output circuits 306 interface control logic 302 with a keypad 308, display 310, audio processing circuits 312, receiver 320, and transmitter 322. The keypad 308 allows the operator to dial numbers, enter commands, and select options. The display 310 allows the operator to see dialed digits, stored information, and call status information. Audio processing circuits 312 provide basic analog audio outputs to a speaker 314 and accepts analog audio inputs from a microphone. The receiver 320 and transmitter 322 receive from transmit signals using a shared antenna 324. Receiver 320 comprises a receiver 200 as shown in FIG. 7 with an adaptive equalizer 100.

Figure 9:
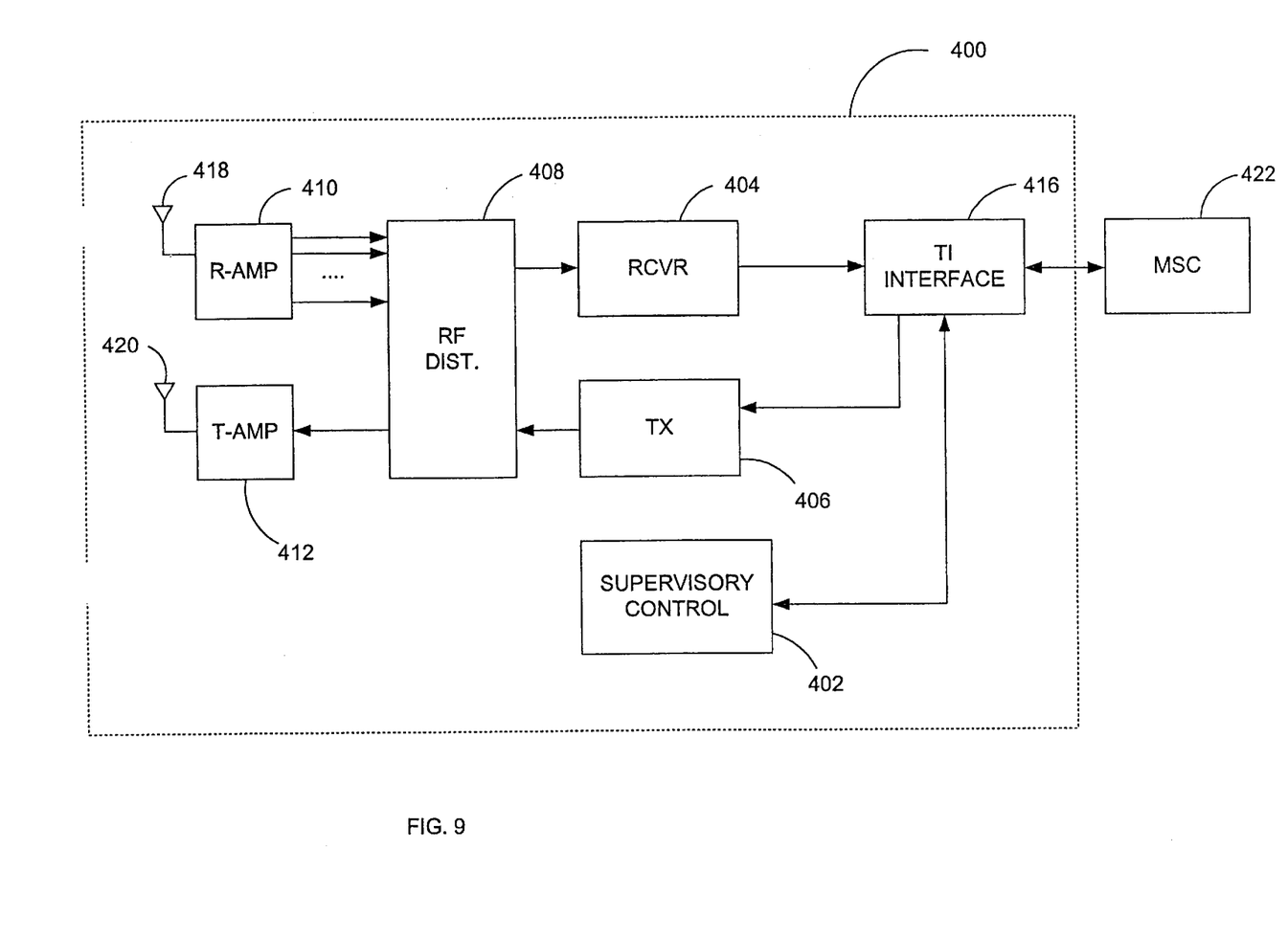
FIG. 9 is a block diagram of a base station incorporating the receiver of FIG. 7.

FIG. 9 is a block diagram of an exemplary base station 400 in which the equalizer 100 of the present invention may be used. Base station 400 comprises a supervisory control 402, receiver 404, transmitter 406, radio frequency (RF) distributor 408, receiver amplifiers 410, transmit amplifier 412, duplexer 414, T1 interface 416, receive antenna 418, and transmit antenna 420. Receiver 404 is coupled to the receive antenna 418 by RF distributor 408 and receiver amplifiers 410. RF distributor 408 splits the received signal into multiple carrier signals and directs each carrier signal to a corresponding receiver 404. Receiver 404 comprises the receiver 200 of FIG. 7 with an adaptive equalizer 100. Transmitter 406 is coupled by the RF distributor 408 and transmit amplifier 412 to a transmit antenna 420. In the transmit direction, RF distributor 408 combines signals from several transmitters 406. The combined signal is then amplified by transmit amplifier 412 for output to the transmit antenna 420. T1 interface 416 interfaces the receiver 404 and transmitter 406 with a mobile services switching center (MSC) 422. Supervisory control 402 comprises the logic for controlling the operation of the base station 400 which may be implemented in a microprocessor.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An equalizer to equalize a signal transmitted over a communication channel with an unknown and varying impulse response, said equalizer comprising:

an equalizing filter having a plurality of adjustable filter coefficients to filter an input signal to obtain an equalized input signal;

a processor to adjust said plurality of filter coefficients for said equalizing filter in response to variations in said impulse response of said communication channel, said processor programmed to:

generate estimated channel coefficients representing an estimated impulse response of said communication channel;

define a channel coefficient matrix B based on said estimated channel coefficients, a filter coefficient vector $\bar{f}$, and a target vector $\bar{c}$, such that:

$$B\bar{f}=\bar{c},$$

partition said channel coefficient matrix B to obtain a plurality of submatrices as follows:

$$B = \begin{bmatrix} P_1 & P_2 \\ P_3 & P_4 \end{bmatrix},$$

where $P_1$ is a Toeplitz matrix;

invert partition $P_1$ using a fast Toeplitz algorithm to obtain $P_1^{-1}$; and compute said filter coefficient vector $\bar{f}$ using $P_1^{-1}$; and a decision algorithm having said equalized input signal as an input to generate an output signal based on said equalized input signal.

2. The equalizer of claim 1 wherein said equalizing filter comprises:

a pre-filter to filter said input signal to obtain a filtered input signal, said adjustable filter coefficients being associated with said pre-filter;

a feedback filter to filter said output signal to obtain a filtered output signal; and a summer to sum said filtered input signal and said filtered output signal to generate said equalized input signal.

3. The equalizer of claim 1 wherein said fast Toeplitz algorithm is a Trench algorithm.

4. The equalizer of claim 1 wherein said processor is further programmed to partition said filter vector $\bar{f}$ to obtain subvectors $\bar{v}$ and $\bar{m}$ of said filter coefficient vector $\bar{f}$, and to partition said target vector $\bar{c}$ to obtain subvectors $\bar{y}$ and $\bar{a}$ of said target vector $\bar{c}$.

5. The equalizer of claim 4 wherein said processor is further programmed to compute said subvector $\bar{m}$ according to the following equation:

$$(P_4 - P_3 P_1^{-1} P_2)\bar{m} = \bar{a} - P_3 P_1^{-1} \bar{y}.$$

6. The equalizer of claim 5 wherein said processor is further programmed to compute said subvector $\bar{v}$ according to the following equation:

$$\bar{v} = P_1^{-1} \bar{y} - P_1^{-1} P_2 \bar{m}.$$

7. The equalizer of claim 1 wherein said submatrix $P_3$ is the Hermitian of submatrix $P_2$.

8. The equalizer of claim 1 wherein said filter coefficients of said equalizing filter are subdivided into a first subset of filter coefficients and a second subset of filter coefficients, and wherein said processor is programmed to compute said first subset of filter coefficients and to compute said second subset of filter coefficients.

9. The equalizer of claim 8 wherein said processor is further programmed to use the invert of submatrix $P_1$ corresponding to said first subset of filter coefficients to compute the invert of the submatrix $P_1$ corresponding to said second set of filter coefficients.

10. A method to compute filter coefficients of a pre-filter for an equalizer, said method comprising:

estimating an impulse response of a communication channel;

defining a channel coefficient matrix B and a target vector $\bar{c}$ based on said estimated impulse response of said communication channel;

defining a filter coefficient vector $\bar{f}$ representing said filter coefficients of said pre-filter, such that the filter coefficient vector is the solution of the system of linear equations:

$$B\bar{f} = \bar{c},$$

solving said system of linear equations to obtain said filter coefficient vector $\bar{f}$ comprising:

partitioning said channel coefficient matrix B to obtain a plurality of submatrices as follows:

$$B = \begin{bmatrix} P_1 & P_2 \\ P_3 & P_4 \end{bmatrix},$$

where $P_1$ is a Toeplitz matrix;
inverting partition $P_1$ using a fast Toeplitz algorithm to obtain $P_1^{-1}$; and
solving said system of linear equations using $P_1^{-1}$, $P_2$, $P_3$, and $P_4$ to obtain said filter coefficient vector $\bar{f}$.

11. The method of claim 10 wherein inverting partition $P_1$ using a fast Toeplitz algorithm to obtain $P_1^{-1}$ comprises inverting partition $P_1$ using the Trench algorithm.

12. The method of claim 10 further comprising partitioning said filter coefficient vector $\bar{f}$ to obtain subvectors $\bar{v}$ and $\bar{m}$ of said filter coefficient vector $\bar{f}$, and partitioning said target vector $\bar{c}$ to obtain subvectors $\bar{y}$ and $\bar{a}$ of said target vector $\bar{c}$.

13. The method of claim 12 solving said system of linear equations using $P_1^{-1}$, $P_2$, $P_3$, and $P_4$ to obtain said filter coefficient vector $\bar{f}$ comprises computing said subvector $\bar{m}$ according to the following equation:

$$(P_4 - P_3 P_1^{-1} P_2)\bar{m} = \bar{a} - P_3 P_1^{-1} \bar{y}.$$

14. The method of claim 13 solving said system of linear equations using $P_1^{-1}$, $P_2$, $P_3$, and $P_4$ to obtain said filter coefficient vector $\bar{f}$ comprises computing said subvector $\bar{v}$ according to the following equation:

$$\bar{v} = P_1^{-1} \bar{y} - P_1^{-1} P_2 \bar{m}.$$

15. The method of claim 10 wherein said submatrix $P_3$ is the Hermitian of submatrix $P_2$.

16. The method of claim 10 further comprising subdividing said filter coefficients of said filter into a first subset of filter coefficients and a second subset of filter coefficients and wherein solving said system of linear equations using $P_1^{-1}$, $P_2$, $P_3$, and $P_4$ to obtain said filter coefficient vector $\bar{f}$ comprises computing said first subset of filter coefficients and computing said second subset of filter coefficients.

17. The method of claim 16 wherein solving said system of linear equations using $P_1^{-1}$, $P_2$, $P_3$, and $P_4$ to obtain said filter coefficient vector $\bar{f}$ comprises inverting submatrix $P_1$ corresponding to said first subset of filter coefficients to compute the invert of submatrix $P_1$ corresponding to said second set of filter coefficients.

18. A receiver comprising:

a receiver front-end to amplify received signals and convert said received signals to a baseband signal at a baseband frequency;

a sampler to sample said baseband signal to produce a sampled signal;

an equalizer to equalize said sampled signal, said equalizer comprising:

an equalizing filter having a plurality of adjustable filter coefficients to filter an input signal to obtain an equalized input signal;

a processor to adjust said plurality of filter coefficients for said equalizing filter in response to variations in an impulse response of a communication channel, said processor programmed to:

generate estimated channel coefficients representing an estimated impulse response of said communication channel;

define a channel coefficient matrix B based on said estimated channel coefficients, a filter coefficient vector $\bar{f}$, and a target vector $\bar{c}$, such that:

$$B\bar{f} = \bar{c},$$

partition said channel coefficient matrix B to obtain a plurality of submatrices as follows:

$$B = \begin{bmatrix} P_1 & P_2 \\ P_3 & P_4 \end{bmatrix},$$

where $P_1$ is a Toeplitz matrix;
invert partition $P_1$ using a fast Toeplitz algorithm to obtain $P_1^{-1}$; and
compute said filter coefficient vector $\bar{f}$ using $P_1^{-1}$; and a decision algorithm having said equalized input signal as an input to generate an output signal based on said equalized input signal.

19. The receiver of claim 18 wherein said equalizing filter comprises:
a pre-filter to filter said input signal to obtain a filtered input signal, said adjustable filter coefficients being associated with said pre-filter;
a feedback filter to filter said output signal to obtain a filtered output signal; and
a summer to sum said filtered input signal and said filtered output signal to generate said equalized input signal.

20. The receiver of claim 18 wherein said fast Toeplitz algorithm is a Trench algorithm.

21. The receiver of claim 18 wherein said processor is further programmed to partition said filter vector $\bar{f}$ to obtain subvectors $\bar{v}$ and $\bar{m}$ of said filter coefficient vector $\bar{f}$, and to partition said target vector $\bar{c}$ to obtain subvectors $\bar{y}$ and $\bar{a}$ of said target vector $\bar{c}$.

22. The receiver of claim 18 wherein said filter coefficients of said equalizing filter are subdivided into a first subset of filter coefficients and a second subset of filter coefficients, and wherein said processor is programmed to compute said first subset of filter coefficients and to compute said second subset of filter coefficients.

23. The receiver of claim 22 wherein said processor is further programmed to use the invert of submatrix $P_1$ corresponding to said first subset of filter coefficients to compute the invert of the submatrix $P_1$ corresponding to said second set of filter coefficients.

24. A mobile terminal in a mobile communication system, said mobile terminal comprising:
a transmitter;
a receiver comprising:
a receiver front-end to amplify received signals and convert said received signals to a baseband signal at a baseband frequency;
a sampler to sample said baseband signal to produce an sampled signal;
an equalizer to equalize said sampled signal, said equalizer comprising:
an equalizing filter having a plurality of adjustable filter coefficients to filter an input signal to obtain an equalized input signal;
a processor to adjust said plurality of filter coefficients for said equalizing filter in response to variations in an impulse response of a communication channel, said processor programmed to:
generate estimated channel coefficients representing an estimated impulse response of said communication channel;
define a channel coefficient matrix B based on said estimated channel coefficients, a filter coefficient vector $\bar{f}$, and a target vector $\bar{c}$, such that:

$$B\bar{f}=\bar{c},$$

partition said channel coefficient matrix B to obtain a plurality of submatrices as follows:

$$B = \begin{bmatrix} P_1 & P_2 \\ P_3 & P_4 \end{bmatrix},$$

where $P_1$ is a Toeplitz matrix;
invert partition $P_1$ using a fast Toeplitz algorithm to obtain $P_1^{-1}$; and
compute said filter coefficient vector $\bar{f}$ using $P_1^{-1}$; and a decision algorithm having said equalized input signal as an input to generate an output signal based on said equalized input signal.

25. The mobile terminal of claim 24 wherein said fast Toeplitz algorithm is a Trench algorithm.

26. The mobile terminal of claim 24 wherein said processor is further programmed to partition said filter vector $\bar{f}$ to obtain subvectors $\bar{v}$ and $\bar{m}$ of said filter coefficient vector $\bar{f}$, and to partition said target vector $\bar{c}$ to obtain subvectors $\bar{y}$ and $\bar{a}$ of said target vector $\bar{c}$.

27. The mobile terminal of claim 24 wherein said filter coefficients of said equalizing filter are subdivided into a first subset of filter coefficients and a second subset of filter coefficients, and wherein said processor is programmed to compute said first subset of filter coefficients and to compute said second subset of filter coefficients.

28. The mobile terminal of claim 27 wherein said processor is further programmed to use the invert of submatrix $P_1$ corresponding to said first subset of filter coefficients to compute the invert of the submatrix $P_1$ corresponding to said second set of filter coefficients.

29. A base station in a mobile communication system, said base station comprising:
a transmitter;
a receiver comprising:
a receiver front-end to amplify received signals and convert said received signals to a baseband signal at a baseband frequency;
a sampler to sample said baseband signal to produce a sampled signal;
an equalizer to equalize said sampled signal, said equalizer comprising:
an equalizing filter having a plurality of adjustable filter coefficients to filter an input signal to obtain an equalized input signal;
a processor to adjust said plurality of filter coefficients for said equalizing filter in response to variations in an impulse response of a communication channel, said processor programmed to:
generate estimated channel coefficients representing an estimated impulse response of said communication channel;
define a channel coefficient matrix B based on said estimated channel coefficients, a filter coefficient vector $\bar{f}$, and a target vector $\bar{c}$, such that:

$$B\bar{f}=\bar{c},$$

partition said channel coefficient matrix B to obtain a plurality of submatrices as follows:

$$B = \begin{bmatrix} P_1 & P_2 \\ P_3 & P_4 \end{bmatrix},$$

where $P_1$ is a Toeplitz matrix;
invert partition $P_1$ using a fast Toeplitz algorithm to obtain $P_1^{-1}$; and
compute said filter coefficient vector $\bar{f}$ using $P_1^{-1}$; and
a decision algorithm having said equalized input signal as an input to generate an output signal based on said equalized input signal.

30. The base station of claim 29 wherein said fast Toeplitz algorithm is a Trench algorithm.

31. The base station of claim 29 wherein said processor is further programmed to partition said filter vector $\bar{f}$ to obtain subvectors $\bar{v}$ and $\bar{m}$ of said filter coefficient vector $\bar{f}$, and to partition said target vector $\bar{c}$ to obtain subvectors $\bar{y}$ and $\bar{a}$ of said target vector $\bar{c}$.

32. The base station of claim 29 wherein said filter coefficients of said equalizing filter are subdivided into a first subset of filter coefficients and a second subset of filter coefficients, and wherein said processor is programmed to compute said first subset of filter coefficients and to compute said second subset of filter coefficients.

33. The base station of claim 32 wherein said processor is further programmed to use the invert of submatrix $P_1$ corresponding to said first subset of filter coefficients to compute the invert of the submatrix $P_1$ corresponding to said second set of filter coefficients.

* * * * *